UNITED STATES PATENT OFFICE.

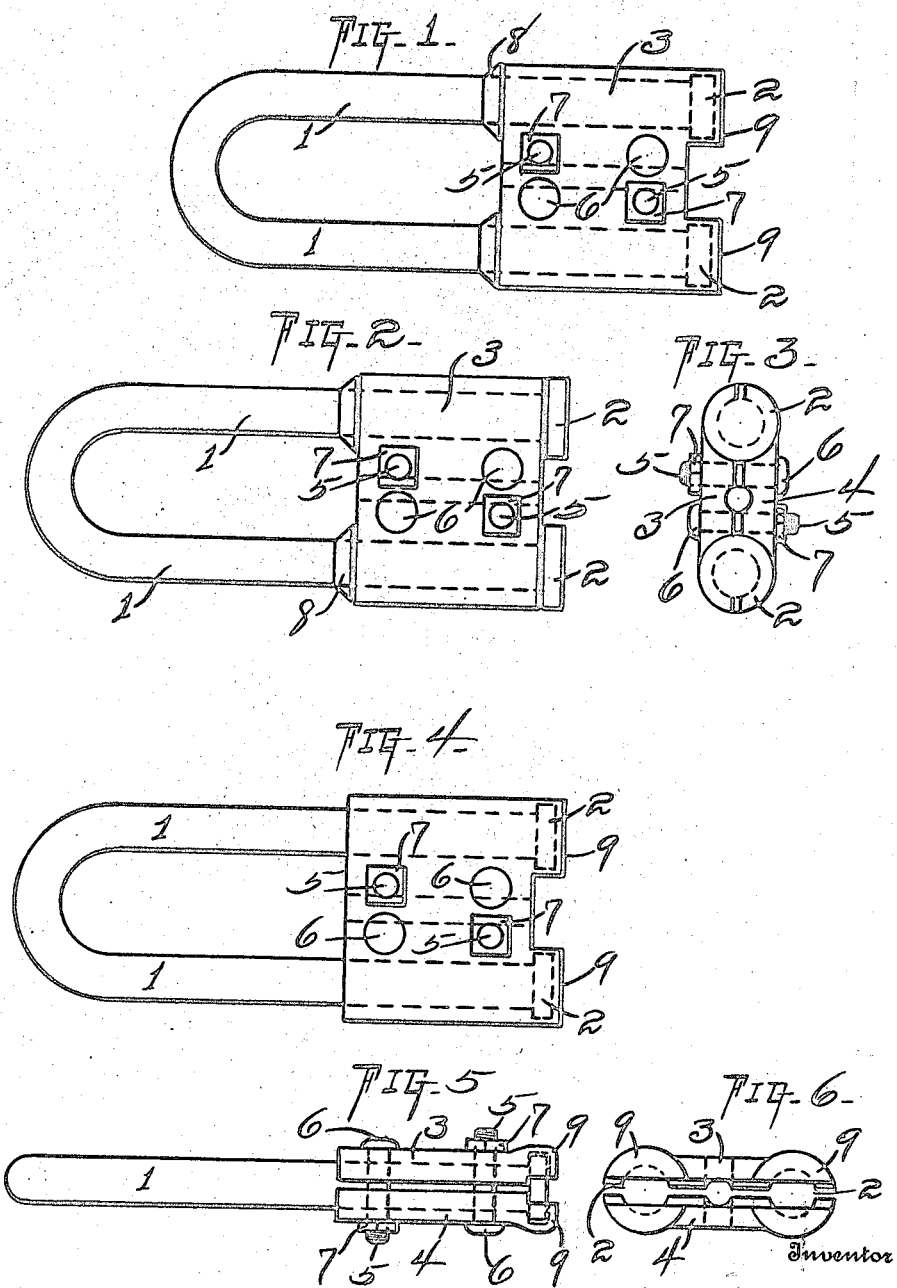

FRED H. BARNEY, OF FORT WORTH, TEXAS, AND DON S. BOWERS, OF TULSA, OKLAHOMA.

SAFETY COMBINATION CONNECTION CLAMP.

1,425,164. Specification of Letters Patent. Patented Aug. 8, 1922.

Application filed November 11, 1920. Serial No. 423,344.

*To all whom it may concern:*

Be it known that we, FRED H. BARNEY, a citizen of the United States of America, residing at Forth Worth, in the county of Tarrant and State of Texas, and DON S. Bowers, a citizen of the United States of America, residing at Tulsa, in the county of Tulsa and State of Oklahoma, have invented certain new and useful Improvements in Safety Combination Connection Clamps, of which the following is a specification.

Our invention relates to combination connection clamps and more particularly to clamps which are used in rod line surface equipment connecting pumping connections for oil or water wells to the power, or similar purposes, and variously called "C C clamps," "C C stirrups," "combination clamps stirrups," and "combination clamps;" and the object is to provide safety clamps for eliminating various troubles and dangers in the handling of the rod line connections. In a modern installation, from two to eleven of these combination clamps are used in each rod line which leads from the power, which is centrally located, to the pumping well. On every rod line leading from the power to the pumping well, there is in every instance from one to two of these combination clamps that must be handled with the hand while the line is in motion. This is very dangerous with the combination clamp now in general use. This handling is necessitated in hooking on a rod line that has been idle or in hooking off a rod line while in motion. It is the custom in most oil fields to pump the well by heads which means that the combination clamps must be handled several times each day. In handling these ordinary or combination clamps in general use, a great many accidents have occurred, by reason of the fact that the pumper or operator's hand is frequently caught and badly crushed. The object of this invention is to provide means for preventing the hand being caught by the clamp and crushed or pinched by the clamp moving on the connecting bolts. Other objects and advantages will be fully explained in the following description and the invention will be more particularly pointed out in the claims.

Reference is had to the accompanying drawings which form a part of this application.

Fig. 1 is a plan view of the clamp and connecting bolt complete. Fig. 2 is a plan view of the clamp and connecting bolt with the protecting hood omitted. Fig. 3 is an end elevation of the device, as shown in Fig. 2. Fig. 4 is a plan view of the clamp and connecting bolt with the up-sets omitted, but showing the protecting hood. Fig. 5 is a side elevation of the devices shown in Fig. 4. Fig. 6 is an end view of the same.

Similar characters of reference are used to indicate the same parts throughout the several views.

The drawings show a U-bolt having arms 1 and heads 2 and clamps in two parts 3 and 4 and bolts 5 having heads 6 and nuts 7 for binding the clamps 3 and 4 on the rods. The clamps have the usual semi-cylindrical cavities in their adjacent faces to form a grip for the rods to be connected. In addition to the heads 2 on the connecting U-bolts, up-sets 8 are formed on the arms 1 of the U-bolts to prevent the clamps from slipping on the arms of the U-bolts. The up-sets 8 may be formed on the arms 1 at the same time that the heads 2 are formed on the arms of the U-bolts. With such provision, there will be no slipping of the clamps 3 and 4 on the arms 1 and the hand of the operator cannot be caught between the clamps 3 and 4 and the bend in the U-bolt.

In addition to the above noted provision of up-sets, hoods or shields 9 are formed by extensions of the metal of the clamps 3 and 4. These hoods or shields will prevent the possibility of the hand of the operator being caught between the clamps 3 and 4 and the heads 2 and pinched.

The improved up-sets and the shields or hoods may be used in combination or separately and both are for the protection of the hands of the operators. When the operator's hand is caught in the clamps of the kind in use, he is absolutely helpless, as the strain on the pull rod line is from 1000 to 3000 lbs. With the improvements herein described, the operator will be protected and the improvements will bring the operating equipment within the requirements of different State laws.

What we claim, is,—

1. Safety rod line connections comprising a U-bolt having heads on the ends of the bolt and up-set members formed on the U-bolt and spaced from the ends thereof and clamps engaging the U-bolt members between said heads and said up-set members.

2. Safety rod line connections comprising a U-bolt having heads on the ends of the bolt and upset members formed on the U-bolt and spaced from the ends thereof and clamps engaging the U-bolt members between said heads and said up-set members and having extension hoods covering said heads.

3. Safety rod line connections comprising a U-bolt having heads on the ends of the bolt and clamps engaging the U-bolt members adjacent to said heads and having extension hoods covering said heads.

In testimony whereof, we set our hands, this 18th day of August, A. D., 1920.

FRED H. BARNEY.
DON S. BOWERS.